Aug. 10, 1965    C. L. HURST    3,199,920
RIM CLAMP FOR TRUCK WHEELS
Filed Sept. 11, 1961    2 Sheets-Sheet 1
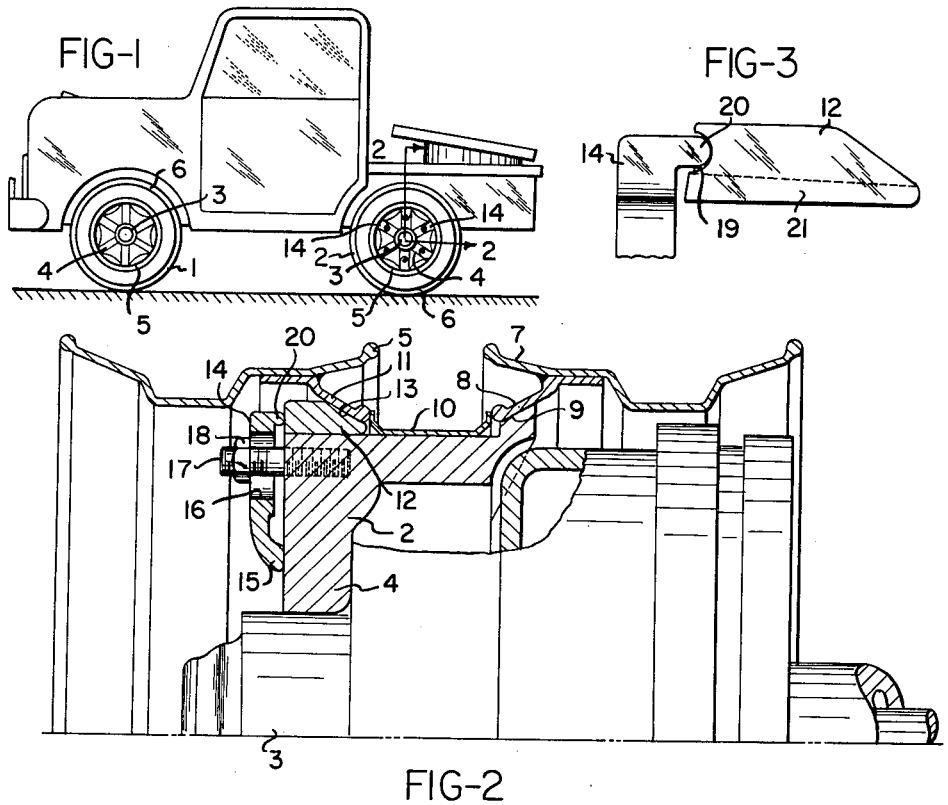
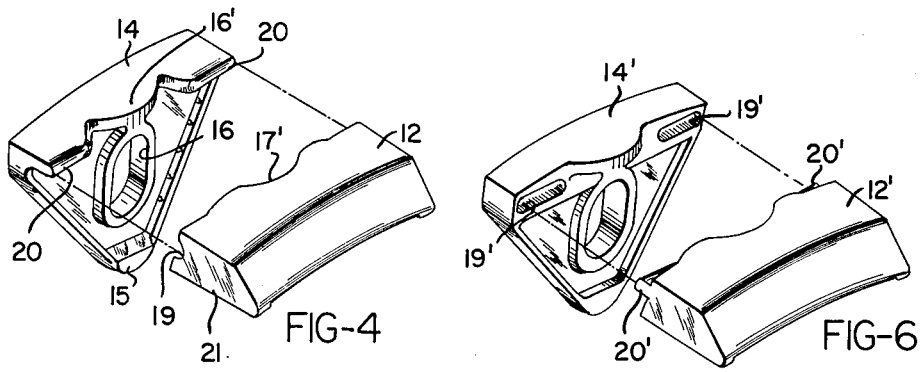
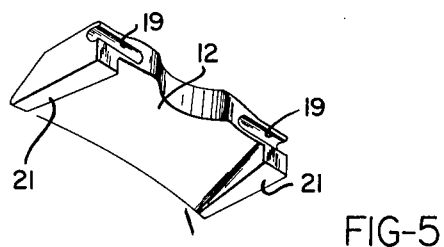
INVENTOR.
CHARLES L. HURST
BY

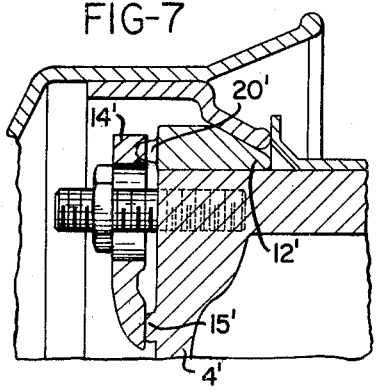
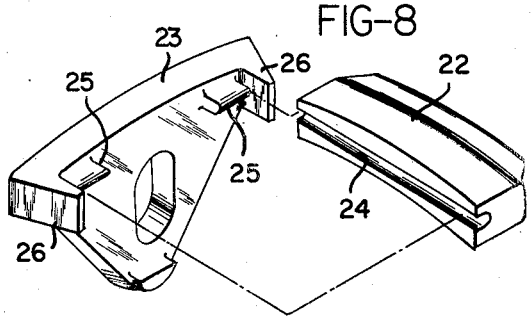
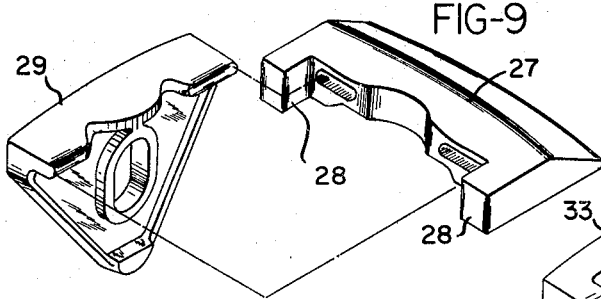
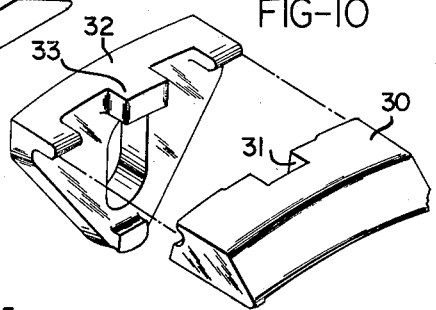
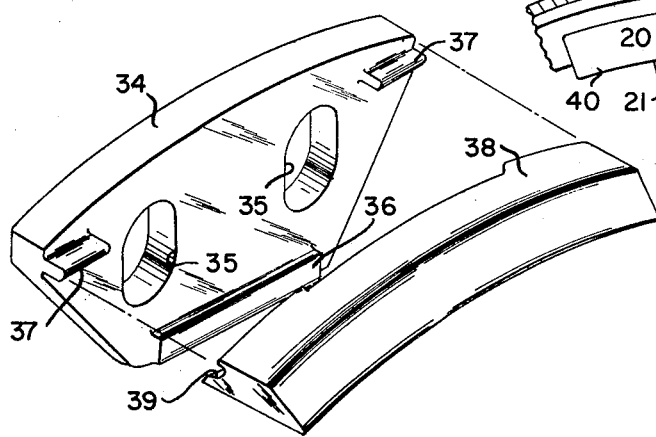
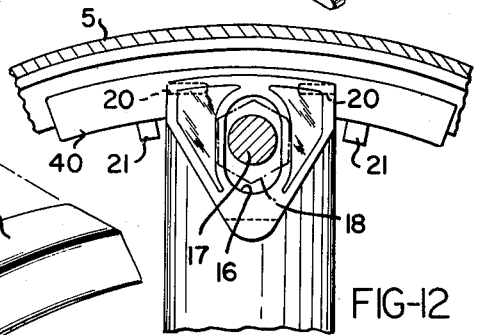

United States Patent Office 3,199,920
Patented Aug. 10, 1965

3,199,920
RIM CLAMP FOR TRUCK WHEELS
Charles L. Hurst, Dayton, Ohio, assignor to Manufacturers Machine Co., Dayton, Ohio, a corporation of Ohio
Filed Sept. 11, 1961, Ser. No. 137,164
11 Claims. (Cl. 301—13)

This invention relates to wheel clamps for mounting tire rims on truck wheels, and is particularly concerned with a two part wheel clamp of this nature, particularly for mounting the tire rims on cast truck wheels.

The present application is a continuation-in-part of my prior application, Serial No. 776,584, filed November 26, 1958, and now abandoned.

A great many truck wheels are of the cast type and these consist of a hub portion and a plurality of spokes radiating therefrom and separated at their outer ends. The rims on which the truck tires are mounted are mounted on the ends of the spokes of the wheels and are clamped thereto by clamps. It is in this connection with clamps of this nature that the present invention is concerned.

The conventional clamps which clamp tire rims to cast truck wheels are L-shaped in cross section and comprise a wedge shaped nose part that is inserted between the end of the spoke and a tapered portion provided about the inside of the rim for engagement with the wedge shaped nose part of the clamp. Such clamps also include a depending portion extending along the spoke and being apertured for receiving a stud mounted in the spoke so that a nut drawn up on the stud will also draw the clamp up into engagement with the tire and the rim.

While clamps of this nature have been employed for many years, they are singularly defective in many respects and the proper mounting of tire rims on truck wheels of the cast type has been a problem of long standing that has never successfully been solved up to the time of the present invention.

The present invention is concerned with a tire clamp of the general nature referred to, which is formed in two parts so that the wedge shaped portion that fits between the rim and the spoke will find a proper seat between the rim and the spoke and, thus, effect simultaneously a superior clamping of the rim to the wheel and alignment of the rim on the wheel.

Two part clamping arrangements are not, in themselves, broadly new, and are illustrated in such patents as the Booth Patent No. 1,280,145, the Forsyth Patent No. 1,573,238, and in the Fisher Swiss Patent No. 143,-876. Each of these patents deals with wheel clamping arrangements in which a wedge like member is disposed between the tire rim and the wheel, and wherein there is a clamp serving to force the wedge member inwardly between the rim and the wheel. The teachings of these patents, however, lack a solution to the problem that exists and has existed in connection with truck wheels because of defects in the particular structures illustrated in these patents.

In the first place, the torques exerted on truck wheels during periods of acceleration or deceleration are so great that it is not uncommon for the rim to slip on the wheels at this time which could cause very serious results, such as tearing off the valve stem of the tire, or losing traction at an important time, and possibly leading to damage to the rim and wheel.

Furthermore, individual rims and individual wheels will vary somewhat as to particular dimensions, and it is, therefore, extremely important for any two part clamping device to be so constructed and arranged that it will accommodate itself readily to these variations, thereby greatly facilitating the application of the clamping arrangements to the wheels and rims while permitting free interchanging thereof, which is, of course, highly important.

What is required for a two part clamp for a truck wheel is not only great strength and rigidity of both parts of the clamp, but also a highly flexible connection between the two parts of the clamp, and, at the same time, a connection between the two parts of the clamp that will hold them against relative movement, particularly in the circumferential direction of the wheel after the clamp has been set in place and tightened up.

The clamping forces that are encountered with such clamps are extremely high, and it is, therefore, essential also that there be a good bearing surface between the two parts of the clamp to prevent the development of the required high clamping forces without damage to either part of the clamp.

Returning to the matter of conventional one piece L-shaped clamps, these have proved defective on account of the fact that it is often the case that they are tilted slightly either outwardly or inwardly on account of variations in the rims and wheels, or in the clamps themselves, so that what occurs is that there is only a line or point pressure between one or both of the wedge shaped nose of the clamp and the rim or wheel. This does not provide either good gripping of the rim on the wheel and can even lead to misalignment of the rim on the wheel in either the radial or lateral direction of the wheel, or in both directions, in which case, misalignment will result in excessive tire wear and could make a truck difficult to handle.

The slippage of the rims on the wheels which will occur if the rim is not tightly gripped on the wheel, as mentioned before, can create a serious situation by tearing off the tire valve stem or leading to damage of the wheel or rim.

In the case of conventional L-shaped clamps coming to rest in a clamped position tilted inwardly or outwardly even slightly, severe stresses can be developed in the clamp itself and this many times led to breakage of the clamp which, again, creates a most undesirable and dangerous condition.

The present invention deals with the foregoing problems of long standing by providing a two part clamp consisting of a wedge member adapted for being inserted between the spoke end and the tapered inside part of the rim, and a clamp member that is received over the stud on the spoke and which forces the wedge member inwardly into seated position between the rim and the spoke. A pivotal connection is provided between the clamp member and the wedge member so that the wedge member always takes a good bearing on both the spoke and the rim regardless of the angular position of the clamp on the spoke while, at the same time, the connection between the clamping member and the wedge member is of such a nature that the clamping member cannot shift circumferentially of the wheel relative to the wedge member.

The present invention is applicable not only to new manufacture but can be applied to existing wheels and rims without any change whatsoever in the construction thereof.

With the foregoing general comments in mind, it will be evident that it is a particular object of the present invention to provide an improved clamping arrangement in the form of a two part clamp for clamping rims on cast truck wheels so that the rim is securely supported on the wheel and in an accurately aligned condition.

A still further object of this invention is the provision of an improved two part clamp for clamping rims on cast truck wheels which may be adapted as well to existing manufacture as it can to new manufacture.

Still another object of this invention is the provision of an improved clamp for clamping tire rims on cast truck wheels which is in the form of a two part clamp, in which the clamp itself is relieved of any extreme stresses such as have previously occurred in connection with one piece L-shaped conventional clamps that has led to the breaking of such conventional clamps.

In the drawings:

FIG. 1 is a more or less diagrammatic side view of a tractor having cast wheels and rim clamps according to the present invention;

FIG. 2 is a fragmentary sectional view indicated by line 2—2 of FIG. 1;

FIG. 3 is an elevational view of the clamp arrangement drawn somewhat on an enlarged scale;

FIG. 4 is a perspective view showing the two part clamp;

FIG. 5 is a perspective view looking in at the side of the wedge member from the side opposite that seen in FIG. 4;

FIG. 6 is a view showing a two part clamp similar to that of FIG. 4 but with the projections and recesses that form the pivotal connection between the wedge member and the clamp member respectively, reversed from their FIG. 4 arrangement;

FIG. 7 is a fragmentary view showing the manner in which the projection between the clamp member and the spoke at the bottom of the clamp member could be provided on the spoke rather than the clamp member;

FIG. 8 is a view showing a two part clamp arrangement according to the present invention, in which the clamp member is provided with wing like projections at its opposite ends to embrace the wedge member whereby to prevent relative circumferential movement therebetween;

FIG. 9 is a view like FIG. 8 but illustrates how the wing like projections could be provided on the ends of the wedge member rather than on the clamp member;

FIG. 10 is another view similar to FIGS. 8 and 9 but showing how one of the clamp and wedge members could be provided with an intermediate projection extending into a recess and the other for preventing relative circumferential movement therebetween;

FIG. 11 is a perspective view showing a two part clamp according to my invention arranged for use on a wide spoke having two studs thereon instead of one; and FIG. 12 is a view looking in at a two part clamp on a wheel from the outside showing how the hole in the clamp member that receives the spoke stud provides clearance about the stud and also showing a modified form of the wedge member which has been elongated so as to extend beyond the side edges of the spoke.

Referring now to the drawings, the tractor illustrated in FIG. 1 has front wheels 1 and rear wheels 2, the wheels 2 usually being the drive wheels. The wheels illustrated are cast wheels, and each comprises a center hub part 3 with a plurality of spokes 4 radiating therefrom. The spokes 4 are not connected at their outer ends and may occur in any number from three to six or more on each wheel.

Each wheel has mounted thereon a rim 5 carrying a tire 6. These may be single rims and tires, as in the case of the front wheels, or they may be duel rims and tires, which is usually the case for the rear driving wheels.

It will be understood that the trailer drawn behind the tractor would be similarly provided with wheels and the rims on these wheels could also be secured in place advantageously by means of the two part clamps of my invention.

FIG. 2 shows a section through the rear wheel 2 and this wheel may carry two rims with the inner rim being located at the inside of the wheel at 7 with the inner tapered member 8 provided on the inside of the rim engaging and grasping tapered portion 9 on the wheel. Between the inner rim 7 and the outer rim 5 there is a sleeve like spacer 10 that fits between the tapered portion 8 of rim 7 and the tapered portion 11 of rim 5, so that, when rim 5 is clamped in place, rim 7 is also clamped to the wheel.

Disposed between tapered part 11 of rim 5 and the end of the spoke illustrated in FIG. 2 is a wedge member 12 having at least its nose part 13 tapered so as to fit between tapered portion 11 of the rim and the end of the spoke. Cooperating with wedge member 12 is a clamp member 14 extending downwardly along the outside of the spoke and spaced therefrom except at the bottom where a projection 15 on the clamp member provides a rocking connection of the clamp member 5 with the spoke. The clamp member is provided with an aperture 16 through which stud 17 of the spoke extends. Aperture 16 has clearance about the stud and particularly in the vertical direction so that the clamp member has freedom of movement on the spoke which, as will be seen, is extremely important for obtaining the proper driving of the wedge member 12 into clamping position.

A lug nut 18 threaded on stud 17 provides the means for forcing clamp member 14 inwardly of the spoke to drive the wedge member into clamping position.

As will be seen in FIGS. 3 and 4, the wedge member is provided with one or more arcuate recesses 19 in the outer face thereof extending in a straight line thereacross in a direction at right angles to the axis of the pertaining spoke. The clamp member 14, on the other hand, is provided with a corresponding number of projections 20 for being received in the recess or recesses 19. The combination of the projection or recess forms a pivotal drive connection between the wedge member and the clamp member that drives the wedge member into clamping position. Preferably, the radius of curvature on the nose of the projections is at least slightly smaller than the radius of curvature of the recesses to provide for free pivoting of the wedge member and clamp member relatively. This is important because the wedge member will be driven inwardly different distances in connection with different wheels and different rims, and the angularity between the wedge member and clamp member will thus vary from time to time. The curvatures of the projections and recesses, however, are near enough to each other that the clamp member takes a good bearing on the wedge member for driving it into clamping position. At this point, it will be noted that the arrangement of the projection means and recess means in a straight line extending laterally across the faces of the wedge member and clamp member provide for free tilting movement of the wedge member and clamp member without in any way impairing the driving connection therebetween. At this point, it will also be noted that the clearance provided by aperture 16 about stud 17 permits vertical movement of the clamp member on the spoke so that the wedge member will always take its proper position between the rim and spoke with a full bearing on both thereof. This is in distinct contrast to what occurs when a one piece L-shaped conventional clamp is tightened up on a cast wheel and occupies any position of angularity other than the precise one where the nose part is exactly positioned to take the proper bearing between the rim and spoke.

It will also be observed that, where the projection means and recess means do not extend over the entire width of the clamp member and wedge member, the said members are locked together against relative circumferential movement, and this assists in preventing slippage of the rims on the wheels as well as greatly facilitating the assembling of the clamp with the wheel and rim and the locking of the wedge member and the clamp member on the wheel.

While it has been found that there is little tendency for the wedge member to slip or to permit the rim to slip, it is desirable, in certain cases where there may be extremely high torques exerted on the wheel, to provide the wedge member with dependent lug elements 21, which will be seen in FIGS. 3, 4 and 5, and which are positioned to embrace the spoke on which the wedge member rests thereby further reducing the possibility that, under extreme conditions, the wedge member will slip.

It has been mentioned that the recess means 19 could be provided on either the wedge member or the clamp member with the projection means 20 provided on the other thereof, and this is specifically illustrated in FIG. 6, wherein the wedge member 12' is provided with projection means 20' whereas the clamp member 14' is provided with recess means 19' for receiving the projection means.

It has also been mentioned that the projection 15 at the bottom of the clamp member which provides for the important rocking connection between the spoke and the clamp member could be provided on the spoke rather than the clamp member, and this is specifically illustrated in FIG. 7. It would be a simple matter to provide this projection on the spoke because the spokes are cast and no particular machining would be required to form the projection thereon. In FIG. 7, the spoke is indicated at 4' and the projection thereon is indicated at 15'. It will be further understood that both the spoke and the clamp member could have projections thereon, the important thing being that a rocking connection be provided so that the clamp member is free to tilt relative to the spoke depending upon the final position taken by the clamp member.

The importance of the locking of the wedge member and the clamp member together against relative circumferential movement has been referred to, this locking together not only assisting in the assembling and locating of the two part clamp on the wheel, but also preventing shifting of the wedge member on the wheel and relative to the clamp member under load. In the above described modifications, the projections and recesses provide this means and, while this has been found to be satisfactory, I also contemplate arrangements of the nature illustrated in FIGS. 8, 9 and 10, wherein the clamp member and wedge member are keyed together against relative circumferential movement by means independent of the projection and recess means thereon, which, in these modifications, is simply a driving means to drive the wedge member into clamping position.

In FIG. 8, the wedge member is indicated at 22 and the clamp member is indicated at 23. The wedge member in this view is provided with a single recess means 24 extending in a straight line completely across the face thereof. This recess means could, of course, be shorter and could consist of one or more recesses. The clamp member is provided with one or more projections 25 for driving engagement with the recess to force the clamp member into clamping position. In FIG. 8, the clamping member is additionally provided with wing like projections 26 at the opposite sides, which extend along opposite ends of the wedge member when the clamp is assembled on the wheel, and thereby positively prevent any relative circumferential movement between the wedge member and clamp member.

In FIG. 9, I illustrate a similar arrangement except that the wedge member 27 has the wing like projections 28 at its opposite ends and between which is received the clamp member 29.

Still further in FIG. 10, I show how wedge member 30 could be provided with a central notch 31, while the clamp member 32 has a projection or lug 33 receivable in the notch, thereby to key the wedge member and clamp member together against relative circumferential movement. It will be evident that still other arrangements could be provided for preventing the aforementioned relative circumferential movement between the clamp member and the wedge member while still maintaining the important tilting drive connection between these members.

Some certain cast truck wheels have only three spokes and these spokes may be quite wide up to about six inches or so across. These spokes are provided with two studs, and my invention can be practiced with wheels of this nature by employing a somewhat modified clamp structure, such as is illustrated in FIG. 11. In this view, the clamp member 34 is formed to the width of the spoke and is provided with two apertures 35 to receive the spoke studs. A projection means 36 at the bottom of the clamp member or a corresponding projection means on the spoke provides for a rocking connection between the clamp member and the spoke. Projection means 37 provided on one of clamp members 34 and the elongated wedge member 38 engages recess means 39 on the other thereof for driving the wedge member into rim clamping position, as hereinbefore described.

The modification of FIG. 11 could be modified from what is specifically illustrated thereon according to any of the several modifications above described or referred to.

FIG. 12 shows a two part clamp arrangement the same as the first described modification, except that the wedge member 40 is elongated and extends a substantial distance beyond the spoke at each side thereof.

From the foregoing detailed description of my invention, it will be seen that there is provided a greatly improved rim clamping arrangement, which provides for more accurate alignment of the rim on the wheel and which always provides for a complete bearing of the wedge member on both the rim and the wheel so that none of the clamping force is lost or dissipated in holding a clamp in a twisted position on the wheel, as previously occurred in connection with the one part clamp. As contrasted with the former conventional one piece L-shaped clamps, the two part clamp of the present invention not only automatically aligns itself and utilizes all of the applied force in clamping the rim, but does not become loose in use, so that once a rim is clamped to a wheel with the two part clamp of the present invention, it remains thereon in alignment and tightly held to the wheel until the clamps are loosened.

The clamp member, in most cases, can be lightened somewhat by making it thinner and providing it with stiffening ribs on the spoke side as will be seen in FIGS. 4 and 6. The clamp member may be strengthened as by the projection 16' thereon which will permit the development of extremely high clamping forces by tightening of the clamp nut without damaging the clamp member. The wedge member includes a recess 17' which loosely receives projection 16'. This projection and recess thus do not interfere with the essential pivoting movement of the clamp member on the wedge member but at the same time provides added safety against relative circumferential shifting movement of the clamp and wedge members in the event of an extreme emergency should the other elements interlocking the members fail.

It will be understood that this invention is susceptible to modification in order to adapt it to different usages and conditions and, accordingly, it is desired to comprehend such modifications within this invention as may fall within the scope of the appended claims.

I claim:

1. In combination, a wheel having a felly for mounting rims, a plurality of two piece rim clamping devices, tightening means for interconnecting said rim clamping devices to said wheel, and an inner and outer rim mounted on said felly, said rim clamping device comprising, a lever member mounted radially on said wheel and a wedging member positioned axially on said wheel, a heeling shoulder depending axially inward from the radially inner portion of said lever member, interconnecting means depending axially inward from the radially outer portion of said lever member to prevent said wedging member from sliding circumferentially when said rim clamping device is operably mounted on said wheel, a bore medial of said shoulder and said interconnecting means adapted to accommodate said tightening means, a contacting surface on the axially outer edge of said wedging member adapted for contacting the axially inner surface along the radially outer edge of said lever member, a felly engaging projection depending radially inward from each end of said wedging member and a conical surface on the radially outer portion of said wedging member for engaging the flange of said outer rim.

2. In combination, a wheel having a felly for mounting rims, a two piece rim clamping device, and tightening means for interconnecting said clamping device to said wheel, said rim clamping device comprising, a lever member adapted for mounting radially on said wheel and a wedging member disposed axially to said wheel, a contacting surface on the axially outer edge of said wedging member, a contacting surface on the axially inner surface of said lever member adjacent its radially outer edge adapted for engaging the contacting surface on said wedging member, a felly engaging projection depending radially inward from each end of said wedging member and a conical surface on the radially outer portion of said wedging member for engaging the outer of said rims.

3. In a two part clamp for clamping rims on cast wheels: a first member in the form of a wedge segment having an arcuately curved radially inner surface in the longitudinal direction of the segment, adapted for insertion in the axial direction of the wheel between the rim and the end of a spoke of the wheel, a second member in the form of a lever adapted for connection to the spoke in a radial position thereon with the radially outer end of the lever engaging the axially outer end of the wedge segment to force the wedge segment in the axial direction of the wheel into the space between the spoke and rim, interfitting means on the inter-engaging ends of said members effecting a pivotal connection between the said members, and means on said interengaging ends of said members operable when said members are in mounted position on the wheel to prevent relative movement between said members in the circumferential direction of the rim.

4. In a two part clamp for clamping rims on cast wheels: a first member in the form of a wedge segment adapted for insertion between the rim and the end of a spoke of the wheel, a second member in the form of a lever adapted for connection to the spoke while engaging the wedge segment to force the wedge segment axially into the space between the spoke and rim, means on said members effecting a pivotal connection between the said members where the said members engage each other when the members are in mounted position on the wheel, and means at the sides of said wedge segment for engagement with lateral surfaces of a spoke of a wheel to lock the wedge segment against circumferential movement on a wheel when mounted thereon.

5. In a two part clamp for clamping a rim having a tapered inner portion to a wheel having a hub and spokes radiating therefrom, a first member in the form of a wedge segment having two arcuate surfaces that converge toward one end of the wedge segment, said wedge segment having another end, a second member in the form of a lever having one end for engaging the said other end of the wedge segment, and means formed on said first and second members which interfit when the one end of the lever is in engagement with the said other end of the wedge segment and prevent relative movement between said lever and wedge segment in a direction transversely on the wedge segment while permitting relative tilting movements thereof about an axis extending transversely of the wedge segment in the region of said other end thereof.

6. In a two part clamp for clamping a rim having a tapered inner portion to a wheel having a hub and spokes radiating therefrom, a first member in the form of a wedge segment having one surface shaped arcuately and on an incline adapted to bear slidably on the inside of a tapered inner portion of a tire rim, said wedge segment having a second arcuate surface adapted to bear slidably on the end of a spoke of the wheel, said surfaces being convergent toward one end of the wedge segment, said wedge segment also having another end, a second member in the form of a lever adapted for being arranged so one end thereof engages the end of the wedge segment with the lever extending from the wedge segment on the side thereof toward said second surface, and means formed on said members arranged to interfit when said members are assembled and operable for locking said members together against relative movement in both radial and circumferential directions of the rim, while permitting relative tilting movement of said members about an axis extending transversely of the wedge segment in the region of the said other end thereof.

7. In a two part clamp according to claim 6 in which said interfitting means comprise recess means and projection means formed on the interengaging portions of said members.

8. In combination; a tire rim which has an inner tapered portion, a wheel having a hub and spokes radiating therefrom and having axial surfaces on their outer ends, a member in the form of an arcuate wedge segment inserted axially into the space between a spoke of the wheel and the tapered portion of the rim and having an inner axial surface slidably bearing on the axial surface on the outer end of the spoke and having an inclined outer surface slidably bearing on said tapered portion of the rim, a lever member extending radially along the spoke in axially spaced relation thereto with its radially outer end engaging the axially outer end of the wedge segment, means at the radially inner end of the lever member forming a rocking engagement thereof with the spoke so the lever member can tilt relative to the spoke in the axial plane of the spoke in driving the wedge segment axially into clamping position between the end of the spoke and the tapered portion of the rim, there being interfitting axially extending recess means and projection means formed on said members at the said outer ends thereof establishing a pivot axis therebetween in the region of said axially outer end of the wedge segment which extends in a direction parallel to the plane of the wheel and at right angles to the spoke, and means locking said wedge segment and lever member together against relative movement in their radial or circumferential direction and also preventing angular movement between said members except about said pivot axis.

9. In combination; a tire rim having a tapered portion around the inner periphery thereof, a wheel having a hub and spokes radiating therefrom, said spokes having axial surfaces at their radially outer ends, a member in the form of an arcuate wedge segment inserted between the outer end of a spoke and the tapered portion of the rim, said wedge segment having an axial surface on the radially inner side and an inclined surface on the radially outer side, said arcuate wedge segment having a rounded recess in the axially outer end thereof, a lever member having aperture therein to fit over a stud on the spoke whereby when the lever member is placed radially along the spoke with the stud on the spoke in said aperture a nut threaded on the stud can be adjusted to urge the radially outer end of the lever member tightly against the axially outer end of the arcuate wedge segment so that the wedge segment is forced axially between the rim and the spoke, there being a projection on one of the radially inner ends of said lever member and the spoke at the radially inner end of the lever member so as to form a pivotal bearing surface between said lever member and the spoke when the lever member is assembled into position, there being a second projection on the radially outer end of said lever member engaging said rounded recess in the wedge segment, said second projection having a rounded end with a radius less than the radius of said rounded recess so that said second projection will rockingly engage said rounded recess to urge said wedge segment axially into position between the end of the spoke and the rim.

10. The combination according to claim 9 in which said wedge segment includes portions at its sides dependant on opposite sides of the spoke.

11. The combination according to claim 9 in which said wedge segment includes portions at opposite ends of the said axially outer end thereof extending axially along the opposite sides of said lever member.

References Cited by the Examiner

UNITED STATES PATENTS

| | | | |
|---|---|---|---|
| 1,233,465 | 7/17 | Harris | 301—24 |
| 1,280,145 | 10/18 | Booth | 301—24 |
| 1,365,582 | 1/21 | Boles | 301—20 |
| 1,599,632 | 9/26 | Barnes | 301—19 |
| 1,790,421 | 1/31 | Holt | 301—20 |
| 1,838,050 | 12/31 | Brunner | 301—22 |
| 2,846,268 | 8/58 | Hunt | 301—12 |
| 3,007,741 | 11/61 | Brown | 301—13 |
| 3,013,842 | 12/61 | Walther | 301—20 |

FOREIGN PATENTS

| | | |
|---|---|---|
| 143,876 | 3/31 | Switzerland. |

ARTHUR L. LA POINT, *Primary Examiner.*

RICHARD A. DOUGLAS, *Examiner.*